United States Patent
Holzer et al.

(10) Patent No.: US 12,395,470 B1
(45) Date of Patent: Aug. 19, 2025

(54) EPHEMERAL MESSAGING IN A DECENTRALIZED END-TO-END ENCRYPTED MESSAGING PLATFORM

(71) Applicant: WhatsApp LLC, Menlo Park, CA (US)

(72) Inventors: Jimmy Enrico Jacques Holzer, Redwood City, CA (US); Kevin Matthew Christensen, Sunnyvale, CA (US); Shalini Sah, Menlo Park, CA (US); Santiago Pina Ros, Las Vegas, NV (US); Elton Kyin-Fong Leong, San Francisco, CA (US); Zafir Khan, Houston, TX (US); Dafeng Ou, San Leandro, CA (US); Tuan Van Nguyen, London (GB)

(73) Assignee: WhatsApp LLC, Menlo Park, CA (US)

(*) Notice: Subject to any disclaimer, the term of this patent is extended or adjusted under 35 U.S.C. 154(b) by 314 days.

(21) Appl. No.: 17/482,279

(22) Filed: Sep. 22, 2021

(51) Int. Cl.
- *H04L 29/06* (2006.01)
- *H04L 5/00* (2006.01)
- *H04L 9/40* (2022.01)

(52) U.S. Cl.
CPC ........ *H04L 63/0428* (2013.01); *H04L 5/0044* (2013.01); *H04L 5/0055* (2013.01)

(58) Field of Classification Search
CPC .......................... H04L 63/0428; H04L 5/0044
See application file for complete search history.

(56) References Cited

U.S. PATENT DOCUMENTS

| | | | |
|---|---|---|---|
| 11,115,363 B1* | 9/2021 | Pina Ros | H04L 51/04 |
| 2008/0077627 A1* | 3/2008 | Yachi | G11B 27/34 |
| 2016/0191442 A1* | 6/2016 | Penilla | H04L 51/42 709/206 |
| 2016/0205028 A1* | 7/2016 | Luna | H04L 47/122 709/233 |
| 2019/0097964 A1 | 3/2019 | Martinazzi et al. | |
| 2021/0352027 A1* | 11/2021 | Smyers | H04L 51/04 |

OTHER PUBLICATIONS

EPO—Extended European Search Report for European Patent Application No. 22195566.9, mailed Feb. 9, 2023, 6 pages.

* cited by examiner

*Primary Examiner* — Jason K Gee
(74) *Attorney, Agent, or Firm* — Eversheds Sutherland (US) LLP

(57) ABSTRACT

Methods, systems, and storage media for providing ephemeral messages are disclosed. Exemplary implementations may: receive, at a first device, a request from a first user to send an ephemeral message to a second user; encrypt the payload of the ephemeral message; send the ephemeral message to the second user according to the recipient identifier; store the ephemeral message locally on the first device of the first user and the second device of the second user; and delete the ephemeral message from the first device and the second device upon expiration of the specified duration of time.

20 Claims, 5 Drawing Sheets

EPHEMERAL MESSAGING IN A DECENTRALIZED END-TO-END ENCRYPTED MESSAGING PLATFORM

TECHNICAL FIELD

The present disclosure generally relates to providing ephemeral messages, and more particularly to ephemeral messaging in a decentralized end-to-end encrypted messaging platform.

BACKGROUND

Sometimes people communicate sensitive information via electronic communications (e.g., text messages). Often, they wish to protect this information from any possible dissemination or access by other people besides the sender and intended receiver of the sensitive communication. One approach may involve using messaging services with end-to-end encryption. Here, the information being communicated is encrypted but that does not always ensure 100% certainty that, with enough time and computing power, the encrypted messages could be decrypted. Expiring or "ephemeral" messages can provide another safeguard for sensitive information. With ephemeral messages, the idea is to keep sensitive messages from persisting in a readable form past a specified time limit.

BRIEF SUMMARY

The subject disclosure provides for systems and methods for providing ephemeral messages. A user is allowed to send ephemeral messages such that the messages in transit cannot be identified as being ephemeral. For example, a sender device and a receiver device may be configured to determine that an encrypted message is set to expire and to delete local copies upon expiration, all without intervention from a third entity (e.g., a central messaging server).

One aspect of the present disclosure relates to a method for providing ephemeral messages. The method may include receiving, at a first device, a request from a first user to send an ephemeral message to a second user. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. The method may include encrypting the payload of the ephemeral message. The method may include sending the ephemeral message to the second user according to the recipient identifier. The method may include storing the ephemeral message locally on the first device of the first user and the second device of the second user. The method may include deleting the ephemeral message from the first device and the second device upon expiration of the specified duration of time.

Another aspect of the present disclosure relates to a system configured for providing ephemeral messages. The system may include one or more hardware processors configured by machine-readable instructions. The processor(s) may be configured to receive, at a first device, a request from a first user to send an ephemeral message to a second user. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. The processor(s) may be configured to encrypt the payload of the ephemeral message. The processor(s) may be configured to send the ephemeral message to the second user according to the recipient identifier. The processor(s) may be configured to store the ephemeral message locally on the first device of the first user and the second device of the second user. The processor(s) may be configured to delete the ephemeral message from the first device and the second device upon expiration of the specified duration of time.

Yet another aspect of the present disclosure relates to a non-transient computer-readable storage medium having instructions embodied thereon, the instructions being executable by one or more processors to perform a method for providing ephemeral messages. The method may include receiving, at a first device, a request from a first user to send an ephemeral message to a second user. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. The method may include encrypting the payload of the ephemeral message. The method may include sending the ephemeral message to the second user according to the recipient identifier. The method may include storing the ephemeral message locally on the first device of the first user and the second device of the second user. The method may include deleting the ephemeral message from the first device and the second device upon expiration of the specified duration of time.

Still another aspect of the present disclosure relates to a system configured for providing ephemeral messages. The system may include means for receiving, at a first device, a request from a first user to send an ephemeral message to a second user. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. The system may include means for encrypting the payload of the ephemeral message. The system may include means for sending the ephemeral message to the second user according to the recipient identifier. The system may include means for storing the ephemeral message locally on the first device of the first user and the second device of the second user. The system may include means for deleting the ephemeral message from the first device and the second device upon expiration of the specified duration of time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Existing ephemeral messages typically reveal that they are ephemeral. For example, expiration information may be carried in unencrypted metadata associated with an encrypted text message. Such information identifying that an encrypted message is ephemeral may assist a central server in pruning expired messages, but at the same time can help any interceptor to identify ephemeral messages to focus decryption efforts. Furthermore, ephemeral messages may persist in electronic storage at the sender's and receiver's client devices, providing an additional risk to exposure.

The subject disclosure provides for systems and methods for providing ephemeral messages. A user is allowed to send ephemeral messages such that the messages in transit cannot be identified as being ephemeral. For example, a sender device and a receiver device may be configured to determine that an encrypted message is set to expire and to delete local copies upon expiration, all without intervention from a third entity (e.g., a central messaging server).

Implementations described herein address these and other shortcomings by deleting expired ephemeral messages at client devices where there is end-to-end encryption and no central entity that can read the ephemeral messages. Exemplary implementations may expire and subsequently delete (e.g., physically remove) ephemeral messages on both the sender's client device and receiver's client device without a central service providing instructions to expire the messages. Expiration information may be encrypted so that any interceptor would not know that the message is an ephemeral message. The sender may define the duration of the message.

Figure 1:
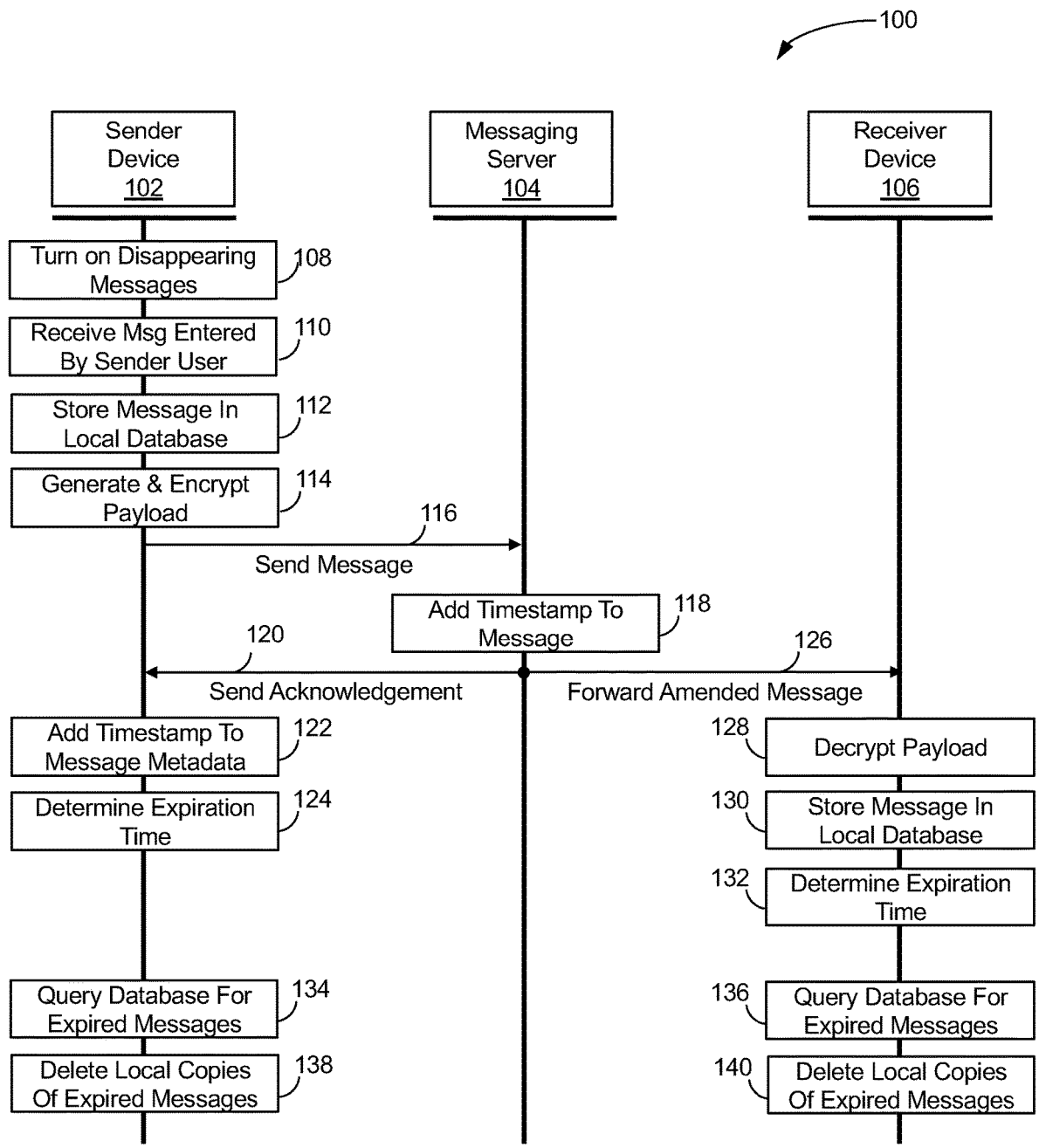
FIG. 1 illustrates an example flow diagram for ephemeral messaging in a decentralized end-to-end encrypted messaging platform, according to certain aspects of the disclosure.

FIG. 1 illustrates an example flow diagram 100 for ephemeral messaging in a decentralized end-to-end encrypted messaging platform, according to certain aspects of the disclosure. The flow diagram 100 involves communications among a sender device 102, a messaging server 104, and a receiver device 106. To illustrate exemplary implementations, a scenario is considered in which two users (Alice and Bob) are conversing via their respective client devices using a messaging application (or "app"). Alice wishes to send Bob a message that will expire and disappear after seven days.

At a step 108, disappearing messages may be turned on at the sender device 102. For example, Alice may turn on a "disappearing messages" feature on the messaging app running on her client device. At a step 110, a message entered by a sender user may be received at the sender device 102. For example, Alice may type "hi" into the message app and press a send button. At a step 112, the message may be stored in a local database on the sender device 102. At a step 114, a payload may be generated at encrypted. When Alice sends a message (e.g., text, image, location, etc.) to Bob, the message sent through the wire may include two parts: the payload and the stanza. The payload may be encrypted so only Alice and Bob can decrypt it using their respective client devices. The stanza may not be encrypted meaning any entities intercepting the message (e.g., the messaging server 106) can read it. The payload may include the content of the message and metadata such as the ephemeral duration of the message in seconds. The stanza may include, among other things, the recipient identification so the server can route the message accordingly.

Figure 2:
FIG. 2 illustrates example communications for ephemeral messaging in a decentralized end-to-end encrypted messaging platform, according to certain aspects of the disclosure.

FIG. 2 illustrates example communications 200 for ephemeral messaging in a decentralized end-to-end encrypted messaging platform, according to certain aspects of the disclosure. An example message 202 includes an encrypted payload (e.g., text='hi'duration='604800') and certain metadata including receiver identification, etc. (e.g., "to='bob@****.com'type='text'id='FEA35F842293A730 3AC7609385D95280'>").

Referring again to FIG. 1, at a step 116, the message may be sent by sender device 102 to the messaging server 104. Here, the payload is encrypted and cannot be read by messaging server 104. Because of this, the messaging server 104 cannot identify the message as being ephemeral because the ephemeral duration (e.g., one week) is included in the message payload. At a step 118, a timestamp may be added to the message at the messaging server 104. For example, when the messaging server 104 receives a message from Alice's client device, it may add the reception timestamp (e.g., using Unix epoch time) to the stanza. At a step 120, an acknowledgement (or "ack") may be sent be the messaging server 104 to the sender device 102. In FIG. 2, an example acknowledgement 204 may include the reception timestamp (e.g., t='1569960837').

At a step 122, in FIG. 1, the timestamp may be added to metadata associated with the message locally stored at the sender device 102. At a step 124, an expiration time of the message may be determined at the sender device 102. For example, once Alice's client device has received the ack from the messaging server 104, an expiration timestamp may be computed (e.g., reception timestamp plus ephemeral duration) and inserted in the database as metadata. Alice's client device may read the timestamp (e.g., "t" attribute in acknowledgement 204 in FIG. 2) and determines that the message needs to be deleted at time conveyed by the timestamp plus the ephemeral duration (e.g., 604800 seconds or exactly one week). At a step 126, the amended message may be forwarded by the messaging server 104 to the receiver device 106. For example, when the messaging server 104 receives a message from Alice's client device, it may add the reception timestamp (see step 118, e.g., using Unix epoch time) to the stanza and forwards the message to Bob's client device. In FIG. 2, an example amended message 206 includes similar information as the message 202 with the addition of the timestamp (e.g., t='1569960837').

Returning to FIG. 1, at a step 128, the payload of the message may be decrypted. For example, Bob's device may decrypt the message payload to reveal the text of Alice's message and an ephemeral duration (e.g., text=hi, duration=604800). At a step 130, the message may be stored in a local database on the receiver device 106. At a step 132, an expiration time of the message may be determined at the receiver device 106. For example, Bob's client device may read the timestamp (e.g., "t" attribute in acknowledgement 204 in FIG. 2) and determine that the message needs to be deleted at time conveyed by the timestamp plus the ephemeral duration (e.g., 604800 seconds or exactly one week). According to some implementations, when Bob receives an ephemeral message, his device will also store the message in the local database. The ephemeral duration may be inserted as metadata associated with the message as stored in the database of the receiver database 106. The reception timestamp may be read from the stanza and the expiration timestamp is directly computed and inserted in the database. Since a duration is present and positive (>0), Bob's device may read the message timestamp (e.g., "t" attribute) and determine that this message needs to be deleted at the time conveyed by the timestamp plus the ephemeral duration.

At a step 134, the local database of the sender device 102 may be queried for expired messages. At a step 136, the local database of the receiver device 106 may be queried for expired messages. According to some implementations, the deletion service may be a background thread implemented on client devices (e.g., sender device 102 and receiver device 104) in charge of deleting the expired ephemeral messages. The deletion service may query the database for all messages with an expiration timestamp earlier than the current time. All messages returned by this query may be removed along with their metadata. As a result, the messages may not be visible anymore on screen via sender device 102 or receiver device 106.

At a step 138, local copies of any expired messages may be deleted from the local database of sender device 102. At a step 140, local copies of any expired messages may be deleted from the local database of receiver device 106. Since the expiration timestamp is computed with the same information, the message will disappear from both the sender device 102 and the receiver device 106 at the same time.

According to some implementations, the deletion service may not delete ephemeral messages from a conversation currently open on screen via the messaging app running on the sender device 102 and the receiver device 104, which may avoid messages disappearing while users are reading them. If a message has been identified as expired, the deletion service may check if the conversation containing this message is currently active. In that case, the message may not be deleted. This message may be deleted next time the deletion service is running. The deletion service may not run permanently but when some trigger events are met. Examples of such trigger events may include one or more of the messaging app launching on a client device, an ephemeral conversation being closed within the messaging app running on the client device, when messages are backed up, and/or other trigger events. To limit the impact of the deletion service on an overall messaging system, the number of consecutive runs may be limited. For example, the deletion service may never run more than once every thirty seconds even if more trigger events have been met. In some implementations, since ephemeral messages may not be guaranteed to be deleted from the client device as soon as they expire, the messaging app may hide expired messages from the users. In other words, any expired ephemeral message may not be rendered in a user interface of the messaging app until the expired messages are physically deleted from the device during the next deletion service run.

The disclosed system(s) address a problem in traditional applications providing ephemeral messages techniques tied to computer technology, namely, the technical problem of making ephemeral messages unidentifiable as such to any interceptors between a sender device and a receiver device. The disclosed system solves this technical problem by providing a solution also rooted in computer technology, namely, by providing for obfuscating an exact location of a user. The disclosed subject technology further provides improvements to the functioning of the computer itself because it improves processing and efficiency in providing ephemeral messages.

Figure 3:
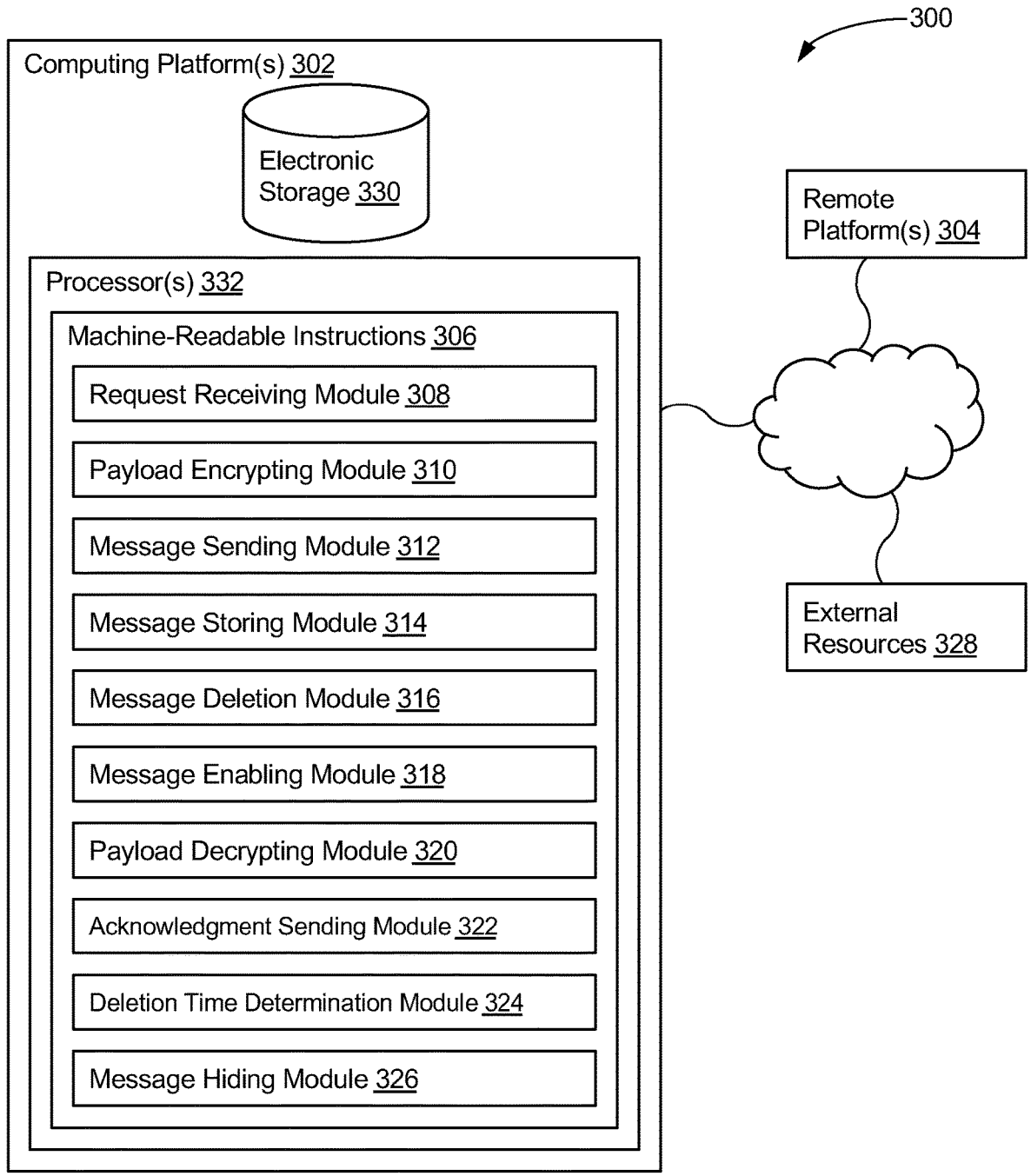
FIG. 3 illustrates a system configured for providing ephemeral messages, in accordance with one or more implementations.

FIG. 3 illustrates a system 300 configured for providing ephemeral messages, according to certain aspects of the disclosure. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of request receiving module 308, payload encrypting module 310, message sending module 312, message storing module 314, message deletion module 316, message enabling module 318, payload decrypting module 320, acknowledgment sending module 322, deletion time determination module 324, message hiding module 326, and/or other instruction modules.

Request receiving module 308 may be configured to receive, at a first device, a request from a first user to send an ephemeral message to a second user. The ephemeral message may include a message that disappears after the specified duration. In some implementations, ephemeral messages may be sent through a decentralized end-to-end encrypted messaging platform. The ephemeral message may include a payload and a stanza. The payload may include content of the ephemeral message and metadata including a specified duration of time. In some implementations, the metadata may include a timestamp. The stanza may include a recipient identifier associated with the second user and/or a second device of the second user. The second user may be different from the first user. The second device may be different from the first device.

Payload encrypting module 310 may be configured to encrypt the payload of the ephemeral message. By way of non-limiting example, the ephemeral message and/or components thereof may be encrypted using one or more of a symmetric encryption method, an asymmetric encryption method, and/or a hashing method.

Message sending module 312 may be configured to send the ephemeral message to the second user according to the recipient identifier. In some implementations, the ephemeral message may be sent to the second user by way of a messaging server (e.g., messaging server 104 in FIG. 1).

Message storing module 314 may be configured to store the ephemeral message locally on the first device of the first user and the second device of the second user. Storing the ephemeral message locally on the first device may include storing the ephemeral message in an electronic storage device disposed within the first device. Storing the ephemeral message locally on the second device may include storing the ephemeral message in an electronic storage device disposed within the second device.

Message deletion module 316 may be configured to delete the ephemeral message from the first device and the second device upon expiration of the specified duration of time. Deleting the ephemeral message may be performed without an instruction to do so from any interceptor of the ephemeral message. In some implementations, a given interceptor may include a central messaging service. In some implementations, a given interceptor may include a bad actor. The deleting may include querying databases of the first device and the second device for messages having an expiration timestamp. The deleting may be based at least in part on trigger events. By way of non-limiting example, the trigger events may include at least one of a first event of launching a messaging application, a second event of closing an ephemeral conversation, and/or a third event of backing up messages on the first device and the second device. The deleting may be limited to occur at most once every thirty seconds (or other period). The ephemeral message disappearing after the specified duration may include being deleted from the first device. The ephemeral message disappearing after the specified duration may include being deleted from the second device.

Message enabling module 318 may be configured to enable disappear messages on at least the first device. Enabling disappearing messages may be an optional setting on the first device and/or the second device. In some implementations, disappearing messages must be enabled on the first device and the second device for the ephemeral message to be sent from the first device to the second device. In some implementations, disappearing messages must be enabled on at least the first device for the ephemeral message to be sent from the first device to the second device. Ephemeral messages may disappear from the second device after the specified duration regardless of whether disappearing messages is enabled on the second device.

Payload decrypting module 320 may be configured to decrypt the payload of the ephemeral message. By way of non-limiting example, the ephemeral message and/or components thereof may be decrypted using one or more of a symmetric decryption method, an asymmetric decryption method, and/or a dehashing method.

Acknowledgment sending module 322 may be configured to send an acknowledgment to the first device that the ephemeral message was received by the second device.

Deletion time determination module 324 may be configured to determine a deletion time for the ephemeral message based at least in part on the timestamp. In some implementations, the specified duration may be determined by the first user as sender. In some implementations, by way of non-limiting example, the duration may include at least one of seconds, minutes, hours, days, weeks, months, or years.

Message hiding module 326 may be configured to hide the ephemeral messages from the first user and the second user prior to deleting the ephemeral messages. Disappearing after the specified duration may include being omitted from presentation of other unexpired ephemeral messages via a user interface.

In some implementations, computing platform(s) 302, remote platform(s) 304, and/or external resources 328 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 328 may be operatively linked via some other communication media.

A given remote platform 304 may include one or more processors configured to execute computer program modules. The computer program modules may be configured to enable an expert or user associated with the given remote platform 304 to interface with system 300 and/or external resources 328, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 328 may include sources of information outside of system 300, external entities participating with system 300, and/or other resources. In some implementations, some or all of the functionality attributed herein to external resources 328 may be provided by resources included in system 300.

Computing platform(s) 302 may include electronic storage 330, one or more processors 332, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 332, information received from computing platform(s) 302, information received from remote platform(s) 304, and/or other information that enables computing platform(s) 302 to function as described herein.

Processor(s) 332 may be configured to provide information processing capabilities in computing platform(s) 302. As such, processor(s) 332 may include one or more of a digital processor, an analog processor, a digital circuit designed to process information, an analog circuit designed to process information, a state machine, and/or other mechanisms for electronically processing information. Although processor(s) 332 is shown in FIG. 3 as a single entity, this is for illustrative purposes only. In some implementations, processor(s) 332 may include a plurality of processing units. These processing units may be physically located within the same device, or processor(s) 332 may represent processing functionality of a plurality of devices operating in coordination. Processor(s) 332 may be configured to execute modules 308, 310, 312, 314, 316, 318, 320, 322, 324, and/or 326, and/or other modules. Processor(s) 332 may be configured to execute modules 308, 310, 312, 314, 316, 318, 320, 322, 324, and/or 326, and/or other modules by software; hardware; firmware; some combination of software, hardware, and/or firmware; and/or other mechanisms for configuring processing capabilities on processor(s) 332. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, and/or 326 are illustrated in FIG. 3 as being implemented within a single processing unit, in implementations in which processor(s) 332 includes multiple processing units, one or more of modules 308, 310, 312, 314, 316, 318, 320, 322, 324, and/or 326 may be implemented remotely from the other modules. The description of the functionality provided by the different modules 308, 310, 312, 314, 316, 318, 320, 322, 324, and/or 326 described below is for illustrative purposes, and is not intended to be limiting, as any of modules 308, 310, 312, 314, 316, 318, 320, 322, 324, and/or 326 may provide more or less functionality than is described. For example, one or more of modules 308, 310, 312, 314, 316, 318, 320, 322, 324, and/or 326 may be eliminated, and some or all of its functionality may be provided by other ones of modules 308, 310, 312, 314, 316, 318, 320, 322, 324, and/or 326. As another example, processor(s) 332 may be configured to execute one or more additional modules that may perform some or all of the functionality attributed below to one of modules 308, 310, 312, 314, 316, 318, 320, 322, 324, and/or 326.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
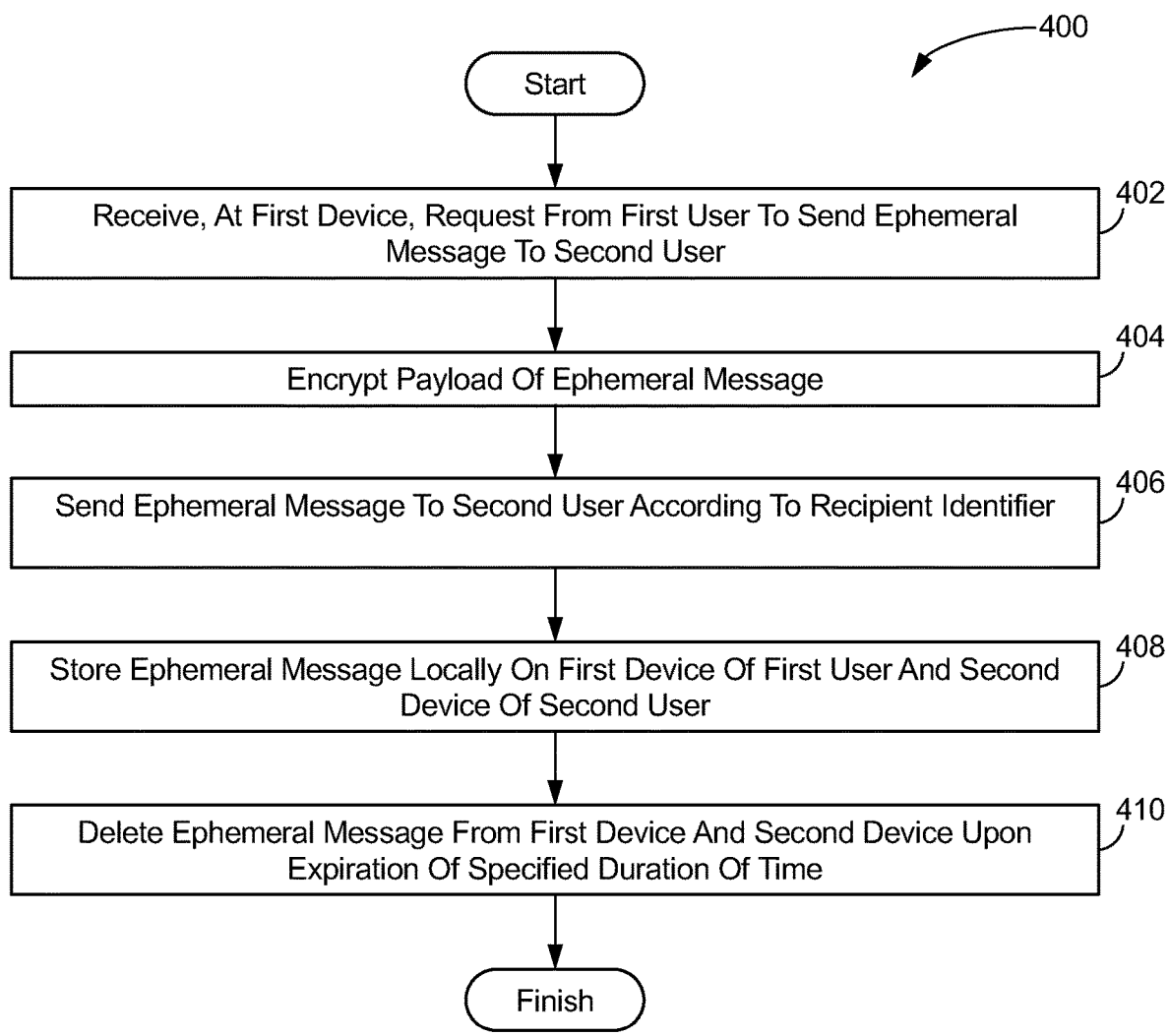
FIG. 4 illustrates an example flow diagram for providing ephemeral messages, according to certain aspects of the disclosure.

FIG. 4 illustrates an example flow diagram (e.g., process 400) for providing ephemeral messages, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, the process 400 may include receiving, at a first device, a request from a first user to send an ephemeral message to a second user. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. At step 404, the process 400 may include encrypting the payload of the ephemeral message. At step 406, the process 400 may include sending the ephemeral message to the second user according to the recipient identifier. At step 408, the process 400 may include storing the ephemeral message locally on the first device of the first user and the second device of the second user. At step 410, the process 400 may include deleting the ephemeral message from the first device and the second device upon expiration of the specified duration of time.

For example, as described above in relation to FIGS. 1-3, at step 402, the process 400 may include receiving, at a first device, a request from a first user to send an ephemeral message to a second user, through request receiving module 308. The second user may be different from the first user. The ephemeral message may include a payload and a stanza. The payload may include content of the ephemeral message and metadata including a specified duration of time. The stanza may include a recipient identifier associated with the second user and/or a second device of the second user. The second device may be different from the first device. At step 404, the process 400 may include encrypting the payload of the ephemeral message, through payload encrypting module 310. At step 406, the process 400 may include sending the ephemeral message to the second user according to the recipient identifier, through message sending module 312. At step 408, the process 400 may include storing the ephemeral message locally on the first device of the first user and the second device of the second user, through message storing module 314. At step 410, the process 400 may include deleting the ephemeral message from the first device and the second device upon expiration of the specified duration of time, through message deletion module 316.

According to an aspect, the ephemeral message comprises a message that disappears after the specified duration.

According to an aspect, the specified duration is determined by the first user as sender.

According to an aspect, the duration comprises at least one of seconds, minutes, hours, days, weeks, months, or years.

According to an aspect, the process 400 further includes enabling disappearing messages on at least the first device.

According to an aspect, the ephemeral messages are sent through a decentralized end-to-end encrypted messaging platform.

According to an aspect, the process 400 further includes decrypting the payload of the ephemeral message.

According to an aspect, the process 400 further includes sending an acknowledgment to the first device that the ephemeral message was received by the second device.

According to an aspect, the metadata comprises a timestamp.

According to an aspect, the process 400 further includes calculating a deletion time for the ephemeral message based at least in part on the timestamp.

According to an aspect, the deleting comprises querying databases of the first and second devices for messages having an expiration timestamp.

According to an aspect, the deleting is based at least in part on trigger events.

According to an aspect, the trigger events comprise at least one of launching a messaging application, closing an ephemeral conversation, and/or backing up messages on the devices.

According to an aspect, the deleting is limited to occur at most once every 30 seconds.

According to an aspect, the process 400 further includes hiding the ephemeral messages from the first and second users prior to deleting the ephemeral messages.

Figure 5:
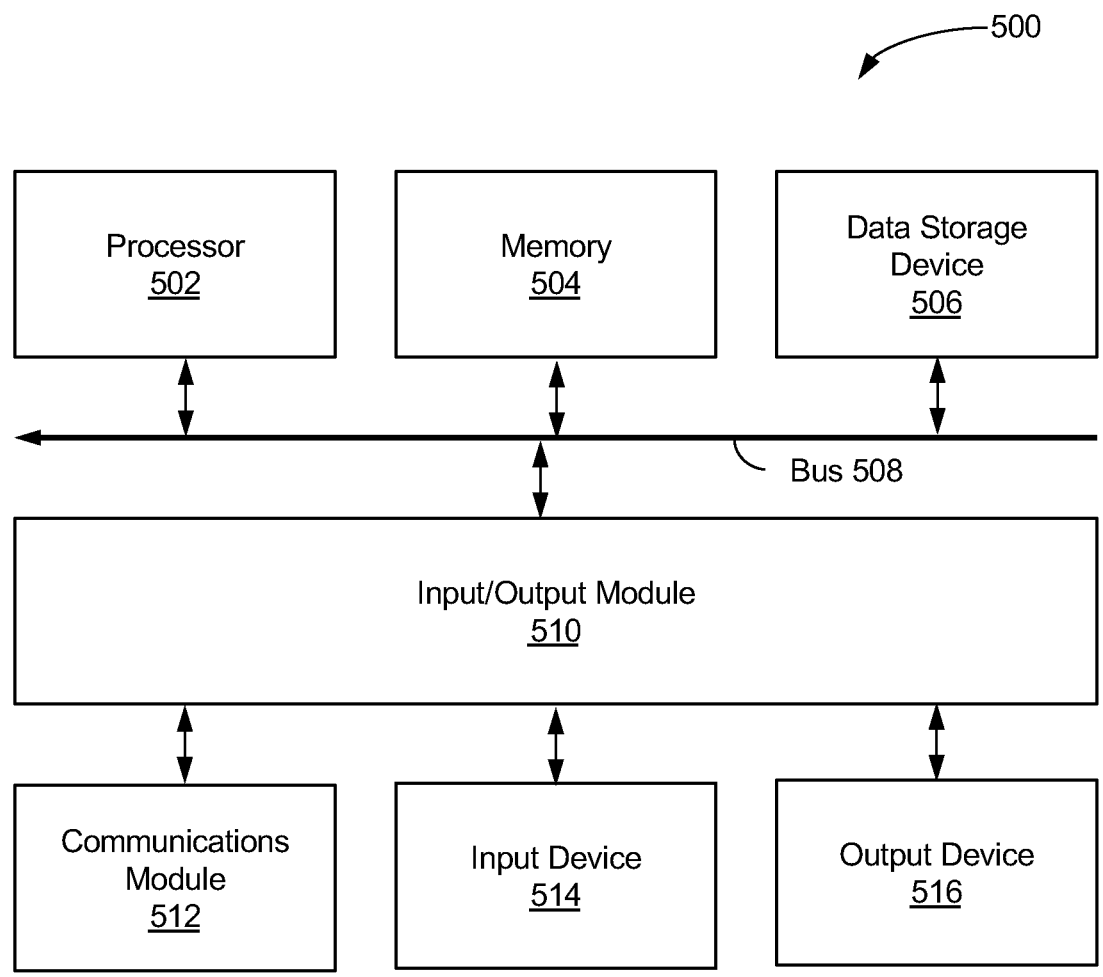
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A. B, and C; and/or at least one of each of A. B. and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing ephemeral messages, the method comprising:
receiving, at a first device, a request from a first user to send an ephemeral message to a second user, the second user being different from the first user, the ephemeral message comprising a payload and a stanza, the payload comprising content of the ephemeral message and metadata comprising a specified duration of time, the stanza comprising a recipient identifier associated with the second user and/or a second device of the second user, the second device being different from the first device;
encrypting the payload of the ephemeral message;
appending, at a server, a reception timestamp to the stanza;
determining, at the first device, an expiration time based on the specified duration of time and the reception timestamp;
sending, via the server, an amended ephemeral message including the expiration time to the second user according to the recipient identifier;
storing the amended ephemeral message locally on the first device of the first user and the second device of the second user;
determining, at the expiration time, whether a conversation containing the amended ephemeral message is active; and
deleting, based on a determination that the conversation is inactive, the amended ephemeral message from the first device and the second device.

2. The method of claim 1, wherein the ephemeral message comprises a message that disappears after the specified duration of time.

3. The method of claim 2, wherein the specified duration of time is determined by the first user as sender.

4. The method of claim 1, wherein the specified duration of time comprises at least one of seconds, minutes, hours, days, weeks, months, or years.

5. The method of claim 1, further comprising:
enabling disappearing messages on at least the first device.

6. The method of claim 1, wherein the ephemeral messages are sent through a decentralized end-to-end encrypted messaging platform.

7. The method of claim 1, further comprising: decrypting the payload of the ephemeral message.

8. The method of claim 7, further comprising:
sending an acknowledgment to the first device that the ephemeral message was received by the second device, wherein the reception timestamp is included in the acknowledgment.

9. The method of claim 1, wherein the metadata comprises the timestamp.

10. The method of claim 9, further comprising:
determining the expiration time for the ephemeral message based on the specified duration of time after the timestamp appended to the stanza.

11. A system configured for providing ephemeral messages, the system comprising: one or more hardware processors configured by machine-readable instructions to:
enable disappearing messages on at least a first device of a first user;
receive, at a first device, a request from a first user to send an ephemeral message to a second user, the second user being different from the first user, the ephemeral message comprising a payload and a stanza, the payload comprising content of the ephemeral message and metadata comprising a specified duration of time, the stanza comprising a recipient identifier associated with the second user and/or a second device of the second user, the second device being different from the first device;
encrypt the payload of the ephemeral message;
append, at a server, a reception timestamp to the stanza;
determine, at the first device, an expiration time based on the specified duration of time and the reception timestamp;
send, via the server, an amended ephemeral message including the expiration time to the second user according to the recipient identifier;
store the amended ephemeral message locally on the first device of the first user and the second device of the second user;
decrypt the payload of the amended ephemeral message;
determine, at the expiration time, whether a conversation containing the amended ephemeral message is active; and
delete, based on a determination that the conversation is inactive, the amended ephemeral message from the first device and the second device.

12. The system of claim 11, wherein the ephemeral message comprises a message that disappears after the specified duration of time.

13. The system of claim 12, wherein the specified duration of time is determined by the first user as sender.

14. The system of claim 11, wherein the specified duration of time comprises at least one of seconds, minutes, hours, days, weeks, months, or years.

15. The system of claim 11, wherein the ephemeral messages are sent through a decentralized end-to-end encrypted messaging platform.

16. The system of claim 11, wherein the one or more hardware processors are further configured by machine-readable instructions to:
send an acknowledgment to the first device that the ephemeral message was received by the second device, wherein the reception timestamp is included in the acknowledgment.

17. The system of claim 11, wherein the metadata comprises the timestamp.

18. The system of claim 17, wherein the one or more hardware processors are further configured by machine-readable instructions to:
determine the expiration time for the ephemeral message as the specified duration of time after the timestamp appended to the stanza.

19. The system of claim 11, wherein the one or more hardware processors are further configured by machine-readable instructions to:
hide the ephemeral messages from the first user and the second user prior to deleting the ephemeral messages.

20. A non-transient computer-readable storage medium having instructions embodied thereon, the instructions being executable by one or more processors to perform a method for providing ephemeral messages, the method comprising:
enabling disappearing messages on at least a first device of a first user;

receiving, at the first device, a request from the first user to send an ephemeral message to a second user, the second user being different from the first user, the ephemeral message comprising a payload and a stanza, the payload comprising content of the ephemeral message and metadata comprising a specified duration of time, the stanza comprising a recipient identifier associated with the second user and/or a second device of the second user, the second device being different from the first device;

encrypting the payload of the ephemeral message;

appending, at a server, a reception timestamp to the stanza;

determining, at the first device, an expiration time based on the specified duration of time and the reception timestamp;

sending, via the server, an amended ephemeral message including the expiration time to the second user according to the recipient identifier, wherein the amended ephemeral message is sent through a decentralized end-to-end encrypted messaging platform;

storing the amended ephemeral message locally on the first device of the first user, wherein the amended ephemeral message is also stored on the second device of the second user;

decrypting the payload of the amended ephemeral message;

determining the expiration time for the amended ephemeral message as the specified duration of time after the timestamp appended to the stanza;

determining, at the expiration time, whether a conversation containing the amended ephemeral message is active;

hiding the amended ephemeral message from the first user and the second user prior to deleting the amended ephemeral message; and deleting, based on a determination that the conversation is inactive, the ephemeral message from the first device upon expiration of the specified duration of time, wherein the amended ephemeral message is deleted from the second device.

* * * * *